(12) United States Patent
Matsuoka et al.

(10) Patent No.: US 8,242,042 B2
(45) Date of Patent: Aug. 14, 2012

(54) OH-TYPE ANION-EXCHANGE HYDROCARBON-BASED ELASTOMER, USE AND PRODUCTION METHOD THEREOF

(75) Inventors: Hitoshi Matsuoka, Yamaguchi (JP); Kenji Fukuta, Yamaguchi (JP)

(73) Assignee: Tokuyama Corporation, Yamaguchi (JP)

( * ) Notice: Subject to any disclaimer, the term of this patent is extended or adjusted under 35 U.S.C. 154(b) by 360 days.

(21) Appl. No.: 12/663,148

(22) PCT Filed: Jun. 5, 2008

(86) PCT No.: PCT/JP2008/060392
§ 371 (c)(1),
(2), (4) Date: Feb. 19, 2010

(87) PCT Pub. No.: WO2008/149950
PCT Pub. Date: Dec. 11, 2008

(65) Prior Publication Data
US 2010/0222208 A1    Sep. 2, 2010

(30) Foreign Application Priority Data
Jun. 5, 2007 (JP) .................................. 2007-148850

(51) Int. Cl.
*B01J 31/06* (2006.01)
*B01J 49/00* (2006.01)
(52) U.S. Cl. .......................................... 502/159; 521/30
(58) Field of Classification Search ............................. None
See application file for complete search history.

(56) References Cited

U.S. PATENT DOCUMENTS

| | | | |
|---|---|---|---|
| 6,294,257 B1 * | 9/2001 | Tsukakoshi et al. | 428/400 |
| 7,081,484 B2 * | 7/2006 | Sugaya et al. | 521/27 |

FOREIGN PATENT DOCUMENTS

| | | |
|---|---|---|
| EP | 1 840 993 | 10/2007 |
| EP | 1 852 928 | 11/2007 |
| JP | 8-302037 | 11/1996 |
| JP | 2002-367626 | 12/2002 |
| JP | 2006-202737 | 8/2006 |
| JP | 2007-042573 | 2/2007 |
| WO | WO 2006/068279 | 6/2006 |

OTHER PUBLICATIONS

International Search Report for PCT/JP2008/060392, mailed Aug. 26, 2008, 5 pgs.

* cited by examiner

*Primary Examiner* — Melvin C Mayes
*Assistant Examiner* — Stefanie Cohen
(74) *Attorney, Agent, or Firm* — Squire Sanders (US) LLP (57) ABSTRACT

The present invention aims at providing an optimal constitution and production method for an OH-type anion-exchange hydrocarbon-based elastomer used when manufacturing a catalyst electrode layer of a solid polymer type fuel cell, in view of a balance of stability, durability and flexibility. Also, the present invention aims to provide an ion-conductivity imparting agent comprising the OH-type anion-exchange hydrocarbon-based elastomer, wherein the elastomer is uniformly dissolved or dispersed and has appropriate viscosity even with a high concentration. The anion-exchange hydrocarbon-based elastomer of the present invention has an iodine value of 3 to 25, contains an anion-exchange group having $OH^-$, $CO_3^{2-}$ and/or $HCO_3^-$ as a counterion in its molecule and is poorly-soluble in water. The hydrocarbon-based elastomer can preferably be used as an ion-conductivity imparting agent for forming a catalyst electrode layer by mixing an organic solvent.

18 Claims, 1 Drawing Sheet

OH-TYPE ANION-EXCHANGE HYDROCARBON-BASED ELASTOMER, USE AND PRODUCTION METHOD THEREOF

FIELD OF THE INVENTION

The present invention relates to an OH-type anion-exchange hydrocarbon-based elastomer, further specifically an OH-type anion-exchange hydrocarbon-based elastomer preferably used as a base compound of an ion-conductivity imparting agent used for forming or bonding of catalyst electrode layers of a solid polymer type fuel cell. Also, the present invention relates to an ion-conductivity imparting agent comprising the OH-type anion-exchange hydrocarbon-based elastomer and a composition for forming a catalyst electrode layer comprising the agent. Further, the present invention relates to a production method of an OH-type anion-exchange hydrocarbon-based elastomer. Furthermore, the present invention relates to a carbonic acid-type anion-exchange hydrocarbon-based elastomer, convertible to the OH-type anion-exchange hydrocarbon-based elastomer by battery operation when used for a hydroxide ion conductive fuel cell membrane.

DESCRIPTION OF THE RELATED ART

Figure 1:
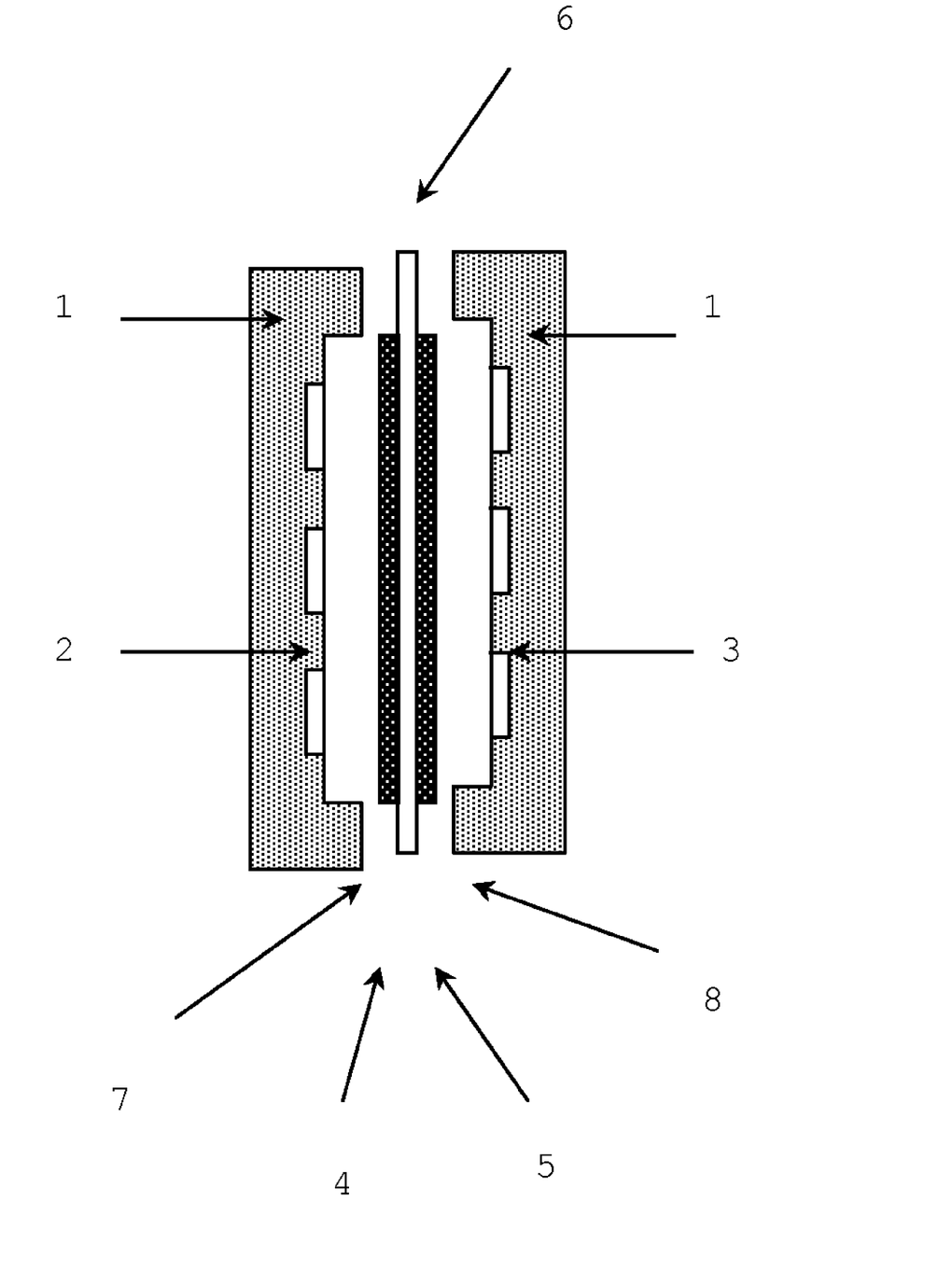
FIG. 1 is a conceptual diagram showing a basic structure of a solid polymer type fuel cell.

A solid polymer type fuel cell uses solid polymer such as ion-exchange resin as an electrolyte, and is characterized by relatively low operating temperature. The solid polymer type fuel cell has, as shown in FIG. 1, a basic structure wherein a space surrounded by cell interstructure 1 having a fuel gas flow hole 2 and oxidizing gas flow hole 3, respectively communicated with outside, is divided by a membrane assembly in which a fuel chamber side catalyst electrode layer 4 and an oxidizing agent chamber side catalyst electrode layer 5 are bonded to both surfaces of a solid polymer electrolyte membrane 6 respectively, to form a fuel chamber 7 communicated with outside via the fuel gas flow hole 2 and an oxidizing agent chamber 8 communicated with outside via the oxidizing gas flow hole 3. Then, in the solid polymer type fuel cell having the above basic structure, a fuel such as hydrogen gas or methanol, etc. is supplied into said fuel chamber 7 via the fuel gas flow hole 2, and oxygen or oxygen containing gas such as air to act as an oxidizing agent is also supplied into the oxidizing agent chamber 8 via the oxidizing gas flow hole 3. Further, an external load circuit is connected between both catalyst electrode layers to generate electric energy by the following mechanism.

When using a cation-exchange type electrolyte membrane as the solid electrolyte membrane 6, a proton (hydrogen ion) generated by contacting a fuel with a catalyst included in the electrode in the fuel chamber side catalyst electrode layer 4 conducts in the solid polymer electrolyte membrane 6 and moves into the oxidizing agent chamber 8 to generate water by reacting with oxygen in the oxidizing agent gas in the oxidizing agent chamber side catalyst electrode layer 5. On the other hand, an electron, generated in the fuel chamber side catalyst electrode layer 4 simultaneously with the proton, moves to the oxidizing agent chamber side catalyst electrode layer 5 through the external load circuit, so that it is possible to use the above reaction energy as an electric energy.

Also, when using an anion-exchange type electrolyte membrane as the solid electrolyte membrane 6, hydrogen or methanol is supplied into the fuel chamber side, oxygen and water are supplied into the oxidizing agent chamber side, and a hydroxide ion, generated by bringing the catalyst included in the electrode into contact with oxygen and water in the oxidizing agent chamber side catalyst electrode layer 5, conducts in the solid polymer electrolyte membrane 6 and moves into the fuel chamber 7 to generate water by reacting the fuel in the fuel chamber side catalyst electrode layer 4. On the other hand, an electron, generated in the fuel chamber side catalyst electrode layer 4 simultaneously with water, moves to the oxidizing agent chamber side catalyst electrode layer 5 through the external load circuit, so that it is possible to use the above reaction energy as an electric energy.

As the above-mentioned cation-exchange type electrolyte membrane, a perfluorocarbon sulfonic acid resin membrane is most commonly used. However, the following problems are identified in the cation-exchange type fuel cell.

(i) Only a noble metal catalyst is usable due to the strongly acidic reaction field, and the perfluorocarbon sulfonic acid resin membrane is also expensive, so that this has limitations in cost reduction.

(ii) it requires to replenish water due to insufficient water retaining capacity.

(iii) it is difficult to reduce electric resistance by decreasing a thickness of membrane due to low physical strength.

(iv) when using methanol as a fuel, methanol is highly permeable, and methanol arriving at an oxidizing agent chamber side catalyst electrode layer reacts with oxygen or air on the surface thereof, causing increase in overvoltage and reduction of output voltage.

To solve the above-mentioned problems, especially the above problem (i), it has been examined to use hydrocarbon-based anion-exchange membrane instead of perfluorocarbon sulfonic acid resin membrane, and several of such solid polymer type fuel cells have been already proposed (Patent Articles 1 to 3). Also, according to the proposals, the above problems (ii) to (iv) can be overcome since the hydrocarbon-based anion-exchange membrane is used.

The catalyst electrode layers 4 and 5 formed on the anion-exchange membrane (solid electrolyte membrane 6) is formed by using embrocation comprising an electrode catalyst, binder and solvent. On this occasion, the embrocation may be applied directly on the solid electrolyte membrane 6; or the embrocation may be first applied on a release coated paper followed by drying, and then, the obtained electrode layer may be transferred on the solid electrolyte membrane 6. Further, in order to increase coefficient of utilization of hydroxide ion generated on the catalyst within the oxidizing agent chamber side catalyst electrode layer (i.e. in order to make the hydroxide ion efficiently move into the fuel chamber), organic solution of the anion-exchange resin is applied on a bonding surface of the diffusion electrode, or the anion-exchange resin is added as binder within the electrode. Namely, the anion-exchange resin is used as a base compound of an ion-conductivity imparting agent, and mobility of the hydroxide ion is improved by applying on the solid electrolyte membrane 6, or using as binder for forming the electrode.

As the anion-exchange resin, there can be used an anion-exchange resin obtained by aminating a chloromethylated compound of a copolymer of aromatic polyether sulfonic acid and aromatic polythioether sulfonic acid (Patent Articles 1 and 2); or a quaternized polymer obtained by treating terminals of a perfluorocarbon polymer having a sulfonic acid group with diamine or a polymer such as quaternized polychloromethylstyrene, preferably those soluble in a solvent (Patent Article 3).

However, even when using the above anion-exchange resin as binder to form a catalyst electrode layer, the bonding between solid electrolyte membrane 6 and catalyst electrode layers 4 and 5 is still insufficient and the durability is lowered, so that the performance has sometimes been deteriorated due to long-term use.

To solve these problems, Patent Article 4 proposes an ion-conductivity imparting agent comprising a hydrocarbon-based elastomer having anion-exchange group in its molecule and being poorly-soluble in water and methanol, or its solution or suspension. The anion-exchange hydrocarbon-based elastomer in Patent Article 4 is obtained by treating a hydrocarbon-based elastomer such as polystyrene-poly(ethylene-butylene)-polystyrene triblock copolymer (SEBS), polystyrene-poly(ethylene-propylene)-polystyrene triblock (SEPS) for chloromethylation with chloromethyl methyl ether, etc., followed by treating with trimethylamine, etc. for quaternarization. A chlorine-type anion-exchange hydrocarbon-based elastomer, in which the obtained chloride ion is counterion, is dissolved in organic solvent and used as the ion-conductivity imparting agent.

In a solid polymer type fuel cell wherein an anion-exchange type electrolyte membrane is used as the solid electrolyte membrane 6, a hydroxide ion conducts in a catalyst electrode layer and electrolyte membrane. For stabilizing the conductivity of hydroxide ion, a hydroxide ion type (hereinafter referred to as OH-type) anion-exchange type electrolyte membrane may be preferable, in which the hydroxide ion is a counterion of the anion-exchange group.

Further, to convert the catalyst electrode layer, formed by the chlorine-type anion-exchange hydrocarbon-based elastomer disclosed in the above Patent Article 4, into OH-type, it is necessary to treat the catalyst electrode layer with sodium chloride (NaOH), etc. to exchange chloride ion and hydroxide ion. However, when treating the already-formed catalyst electrode layer with sodium hydroxide, etc., ion exchange between chloride ion and hydroxide ion occurs only in the surface region of the electrode, and it is difficult or impossible that ion exchange occurs within the electrode. When only a part of chloride ions is subject to ion exchange to convert into hydroxide ion, the conductivity of the hydroxide ion deteriorates to reduce the output.

To overcome the above-mentioned disadvantage, it is considered that an ion-conductivity imparting agent is obtained by performing ion exchange after manufacturing the chlorine-type anion-exchange hydrocarbon-based elastomer and before dissolving the same in an organic solvent, obtaining the OH-type anion-exchange hydrocarbon-based elastomer and bringing the same into solution.

As a result of keen examinations on a structure and property of an anion-exchange hydrocarbon-based elastomer, the present inventors found that when a counterion species of the anion-exchange hydrocarbon-based elastomer is OH⁻, i.e. in case of OH-type anion-exchange hydrocarbon-based elastomer, it absorbs carbon dioxide in air and OH⁻ of the counterion is rapidly reacted with carbon dioxide to substitute with $CO_3^{2-}$, then with $HCO_3^-$. However, the $CO_3^{2-}$ and/or $HCO_3^-$ can be substituted with OH⁻ generated by catalyst reaction during power generation by fuel cell (ion exchange), and discharged out of the system as carbon dioxide when the fuel cell operates. Therefore, even when a part or whole of counterion species (OH⁻) of the anion-exchange hydrocarbon-based elastomer is substituted with $CO_3^{2-}$ and/or $HCO_3^-$, there is no problem in using as a fuel cell. Hereinafter, the anion-exchange hydrocarbon-based elastomer having $CO_3^{2-}$ and/or $HCO_3^-$ as the counterion species may be referred to as a "carbonic acid-type anion-exchange hydrocarbon-based elastomer". Also, the OH-type anion-exchange hydrocarbon-based elastomer and carbonic acid-type anion-exchange hydrocarbon-based elastomer may collectively be referred to simply as an "anion-exchange hydrocarbon-based elastomer".

The ion exchange of the chlorine-type anion-exchange hydrocarbon-based elastomer to OH-type is performed by dipping in sodium hydroxide aqueous solution, etc. Also, at the ion exchange to carbonic acid-type, the elastomer may directly be dipped in a sodium carbonate aqueous solution, etc. for ion exchange. Therefore, when the obtained anion-exchange hydrocarbon-based elastomer is dissolved in an organic solvent, the elastomer needs to be dried for dehydration prior to being dissolved in the organic solvent. However, in an anion-exchange hydrocarbon-based elastomer made of thermoplastic elastomer such as SEBS and SEPS, the following problems arise depending on hydrogenation rate. Namely, when the hydrogenation rate is low and a number of double bonds are present, cross-link occurs at the double bond to cause gelation in the drying step, resulting in remarkable reduction in solubility in the organic solvent. Also, more double bonds cause lower stability and durability of the anion-exchange hydrocarbon-based elastomer itself during the operation of a fuel cell. On the other hand, when highly hydrogenated, the elastomer is lowered in flexibility, and the functions as bonding resin is remarkably reduced.

Particularly, the gelation in the drying step can be a serious problem in the OH-type or carbonic acid-type anion-exchange hydrocarbon-based elastomer. In the chlorine-type anion-exchange hydrocarbon-based elastomer, heating at 40° C. or more rarely causes gelation, but in the OH-type or carbonic acid-type anion-exchange hydrocarbon-based elastomer, the elastomer may gelate under such a drying condition exceeding 40° C. and is hardly dissolved in the organic solvent, so that it is difficult to obtain a homogeneous solution.

Also, for the purpose of making the above anion-exchange hydrocarbon-based elastomer uniformly exist within the catalyst electrode layer or near the bonding surface, and of producing the catalyst electrode layer with good bonding property and high activity, the ion-conductivity imparting agent is preferably dissolved in an organic solvent and used in a solution state when applying it on the bonding surface of the catalyst electrode layer or blending with a composition for forming a catalyst electrode layer including an electrode catalyst. Therefore, Patent Article 4 recommends the use of a solvent with permittivity of 10 or more.

However, the OH-type or carbonic acid-type anion-exchange hydrocarbon-based elastomer has an anion-exchange group having a hydrophilic OH⁻, $CO_3^{2-}$ and $HCO_3^-$ in its molecule as a counterion and a hydrophobic hydrocarbon skeleton. Therefore, solubility behavior to the solvent is complicated, and homogeneous solution is not constantly available even when using a solvent with permittivity of 10 or more. Namely, when using only a solvent with relatively low permittivity, anion-exchange groups (hydrophilic groups) sometimes agglutinate to cause the resulting solution with high viscosity (to gelate). When lowering viscosity to prevent the gelation, concentration is decreased. The lowered viscosity of the embrocation may lead to several undesirable consequences, such as difficulty to form a thick film and necessity to apply it several times to form a coated film with a predetermined thickness.

On the other hand, when using a solvent with relatively high permittivity alone or in large quantity, the hydrocarbon skeleton of the OH-type or carbonic acid-type anion-exchange hydrocarbon-based elastomer may agglutinate to become insoluble, so that a homogeneous solution cannot be obtained.

Patent Article 1 Japanese Unexamined Patent Publication H11-273695
Patent Article 2 Japanese Unexamined Patent Publication H11-135137
Patent Article 3 Japanese Unexamined Patent Publication 2000-331693
Patent Article 4 Japanese Unexamined Patent Publication 2002-367626

DISCLOSURE OF INVENTION

Problem to be Solved by the Invention

The stability, durability and flexibility of an OH-type or carbonic acid-type anion-exchange hydrocarbon-based elastomer are largely affected by residual amount of double bonds. Too large amounts of double bonds cause to deteriorate stability and durability, and too small amounts cause to deteriorate flexibility. Therefore, particularly when using the OH-type or carbonic acid-type anion-exchange hydrocarbon-based elastomer as a base compound of an ion-conductivity imparting agent, it is necessary to adjust the amount of double bonds in an appropriate range.

Also, it is required to optimize drying conditions for preventing gelation of the OH-type or carbonic acid-type anion-exchange hydrocarbon-based elastomer at drying.

On the other hand, gelation or inhomogeneous dispersion of the elastomer may lead to the following disadvantages in an ion-conductivity imparting agent including an anion-exchange type hydrocarbon-based elastomer.

Namely, when applying the ion-conductivity imparting agent on the solid electrolyte membrane, followed by forming the catalyst electrode layer, bonding defect occurs in interfacial proximity between the solid electrolyte membrane and catalyst electrode layer, resulting in problems such as reduction in output voltage and lowered durability due to strength poverty.

Also, when using a composition (embrocation) including the ion-conductivity imparting agent and electrode catalyst to form the catalyst electrode layer, inhomogeneous dispersion of the elastomer in the electrode layer may cause crack formation in the electrode layer, reduced specific surface area of the electrode layer, inhomogeneous dispersion of the electrode catalyst. The reduced specific surface area of the electrode layer results in reduction in reactive area, so that output voltage is decreased. Also, when the electrode catalyst is inhomogeneously dispersed, exposed area of the catalyst is reduced due to uneven distribution, resulting in decrease in output voltage as well.

The present invention, achieved reflecting the above-mentioned prior arts, has a purpose to provide optimal constitution and production method for an OH-type or carbonic acid-type anion-exchange hydrocarbon-based elastomer, used in an ion-conductivity imparting agent, in view of keeping balance of stability, durability and flexibility. Also, the present invention aims to provide an ion-conductivity imparting agent comprising OH-type or carbonic acid-type anion-exchange hydrocarbon-based elastomer, wherein the elastomer can uniformly be dissolved or dispersed even when the concentration is high, and has appropriate viscosity.

Means for Solving the Problem

For accomplishing the purposes, the present inventors found, as a result of keen examinations, that it is possible to obtain an OH-type or carbonic acid-type anion-exchange hydrocarbon-based elastomer, which has excellently balanced stability, durability and flexibility, and is preferably used as a base compound of an ion-conductivity imparting agent, by controlling an iodine value, i.e. a value showing an amount of double bonds, in a specific range and performing a drying step under specific conditions, and come to achieve the present invention.

Also, it was found that by combined use of 2 or more solvents having different permittivity as a solvent or dispersion medium of the anion-exchange hydrocarbon-based elastomer, the elastomer is uniformly dissolved or dispersed to obtain an ion-conductivity imparting agent having appropriate viscosity, resulting in achieving the present invention.

The gist of the present invention for solving the problems will be described as below.

(1) A hydrocarbon-based elastomer having an iodine value of 3 to 25, including an OH-type anion-exchange group having $OH^-$ as a counterion in its molecule, and being poorly-soluble in water.

(2) An ion-conductivity imparting agent for forming a catalyst electrode layer comprising 3 to 20 parts by weight of the elastomer as set forth in (1) per 100 parts by weight of an organic solvent.

(3) The ion-conductivity imparting agent as set forth in (2), wherein said organic solvent comprises a hydrophobic solvent having relative permittivity at 20° C. of 2 to 12 and a hydrophilic solvent having relative permittivity at 20° C. of 13 to 50, and mass ratio of the hydrophobic solvent and the hydrophilic solvent (hydrophobic solvent/hydrophilic solvent) is 98/2 to 90/10.

(4) A composition for forming a catalyst electrode layer of a solid polymer type fuel cell, comprising the ion-conductivity imparting agent as set forth in the above (2) or (3) and an electrode catalyst.

(5) A production method of the elastomer as set forth in (1), comprising the steps of hydrogenating a block copolymer, obtained by block-polymerizing a polymerizable monomer, having a functional group capable of introducing an anion-exchange group, and a conjugated diene compound, to form a hydrogenated polymer so as to have a hydrogenation rate of 80 to 97%, introducing an anion-exchange group having a halogen ion as a counterion into the hydrogenated polymer, ion-exchanging the obtained halogen ion type anion-exchange group-containing hydrogenated polymer to obtain an OH-type anion-exchange group-containing hydrogenated polymer having $OH^-$ as a counterion, and then drying the resulting polymer at 40° C. or less under reduced pressure.

(6) A hydrocarbon-based elastomer, having an iodine value of 3 to 25, including a carbonic acid-type anion-exchange group having $CO_3^{2-}$ and/or $HCO_3^-$ as a counterion in its molecule, and being poorly-soluble in water.

(7) A hydrocarbon-based elastomer, including a carbonic acid-type anion-exchange group, in which a part or whole of $OH^-$ of the hydrocarbon-based elastomer as set forth in the above (1) is converted into $CO_3^{2-}$ and/or $HCO_3^-$, in its molecule, and being poorly-soluble in water.

(8) An ion-conductivity imparting agent for forming a catalyst electrode layer, comprising 3 to 20 parts by weight of the elastomer as set forth in (6) or (7) per 100 parts by weight of the organic solvent.

(9) The ion-conductivity imparting agent as set forth in (8), wherein said organic solvent comprises a hydrophobic solvent having relative permittivity at 20° C. of 2 to 12 and a hydrophilic solvent having relative permittivity at 20° C. of 13 to 50, and mass ratio of the hydrophobic solvent and the hydrophilic solvent (hydrophobic solvent/hydrophilic solvent) is 98/2 to 90/10.

(10) A composition for forming a catalyst electrode layer of a solid polymer type fuel cell, comprising the ion-conductivity imparting agent as set forth in the above (8) or (9) and an electrode catalyst.

(11) A production method of the elastomer as set forth in (6), comprising steps of hydrogenating a block copolymer, obtained by block-polymerizing a polymerizable monomer having a functional group capable of introducing an anion-exchange group and a conjugated diene compound, to form a hydrogenated polymer so as to have a hydrogenation rate of 80 to 97%, introducing an anion-exchange group having a halogen ion as a counterion into the hydrogenated polymer, ion-exchanging the obtained halogen ion type anion-exchange group-containing hydrogenated polymer to obtain a carbonic acid-type anion-exchange group-containing hydrogenated polymer having $CO_3^{2-}$ and/or $HCO_3^-$ as a counterion, and then drying the resulting polymer at 40° C. or less under reduced pressure.

(12) A hydrocarbon-based elastomer having an iodine value of 3 to 25, including an anion-exchange group having $OH^-$, $CO_3^{2-}$ and/or $HCO_3^-$ as a counterion in its molecule, and being poorly-soluble in water.

Effects of the Invention

According to the present invention, there is provided an OH-type and carbonic acid-type anion-exchange hydrocarbon-based elastomers and production methods thereof, the elastomers having excellently balanced stability, durability and flexibility and being preferably used as a base compound of an ion-conductivity imparting agent. Also, according to the present invention, there can be provided an ion-conductivity imparting agent for forming a catalyst electrode layer, in which an anion-exchange hydrocarbon-based elastomer is uniformly dissolved or dispersed even when the concentration is high, and which has appropriate viscosity.

The anion-exchange hydrocarbon-based elastomer of the present invention is excellent in stability and durability since a hydrogenation rate and an iodine value are within specific ranges and reactivity is appropriately controlled, and also has an excellent balance between these properties and flexibility. Namely, the elastomer can be dried without gelation in the drying step after ion-exchanging to the OH-type or carbonic acid-type while keeping flexibility as an elastomer, so that it shows excellent functions as a bonding resin.

Also, the ion-conductivity imparting agent for forming a catalyst electrode layer of the present invention uses the above anion-exchange hydrocarbon-based elastomer as its main component, and therefore functions as an ion conductor of hydroxide ion. Not only increasing effective coefficient of utilization of a catalyst in a catalyst electrode layer, but also it has functions to improve bonding property since the above polymeric elastomer is a hydrocarbon-based polymer similar to an anion-exchange membrane when using for forming a catalyst electrode layer which bonds with a hydrocarbon-based anion-exchange membrane. Particularly in the ion-conductivity imparting agent for forming a catalyst electrode layer of the present invention, the anion-exchange hydrocarbon-based elastomer is uniformly dissolved or dispersed, has high concentration, and has appropriate viscosity. Therefore, it is possible to favorably bond the solid polymer electrolyte membrane and catalyst electrode layer, and to obtain high electrode activity and excellent durability. Also, since the polymeric elastomer is poorly-soluble in water, it is not eluted in water in the fuel or in water obtained as a by-product during the use when using a fuel cell in which a catalyst electrode layer formed by the ion-conductivity imparting agent of the present invention is used, and durability of the cell can be increased.

Also, during operating the fuel cell, $CO_3^{2-}$ and/or $HCO_3^-$ of the carbonic acid-type anion-exchange hydrocarbon-based elastomer is substituted (ion-exchanged) with $OH^-$ generated in a catalyst reaction in power generation of the fuel cell, and $CO_3^{2-}$ and/or $HCO_3^-$ is released out of the system as carbon dioxide. Therefore, even when a part or whole of counterion species ($OH^-$) of the anion-exchange hydrocarbon-based elastomer is converted into $CO_3^{2-}$ and/or $HCO_3^-$, it is possible to use as a fuel cell without problems.

BEST MODE FOR WORKING THE INVENTION

Hereinafter, the present invention will further be described in detail including its best mode.

The anion-exchange hydrocarbon-based elastomer of the present invention is a hydrocarbon-based elastomer including an anion-exchange group having $OH^-$, $CO_3^{2-}$ and/or $HCO_3^-$ as a counterion in its molecule and being poorly-soluble in water, and has an iodine value within a specific range. First, the OH-type anion-exchange hydrocarbon-based elastomer of the present invention will be explained.

The iodine value of the OH-type anion-exchange hydrocarbon-based elastomer of the present invention is in a range of 3 to 25, preferably 4 to 12.

The iodine value is an indicator of an amount of double bonds present in the OH-type anion-exchange hydrocarbon-based elastomer. Higher iodine value means more double bonds. Note that the iodine value can be obtained by titration method.

The OH-type anion-exchange hydrocarbon-based elastomer of the present invention has an iodine value in the above range, and an amount of double bonds controlled within a specific range. Therefore, stability, durability and flexibility are excellently balanced since reactivity, cross-linking property and space structure due to double bond are appropriately controlled. Namely, in the drying step after ion-exchanging into the OH-type, the elastomer can be dried without gelation while keeping flexibility and a degree of elasticity as an elastomer, so that it shows excellent functions as a bonding resin.

The OH-type anion-exchange hydrocarbon-based elastomer preferably has an appropriate degree of elasticity, preferably 1 to 300 (MPa), particularly preferably 3 to 100 (MPa), in terms of Young's modulus at 25° C. By having such a degree of elasticity, not only adhesion between the solid polymer electrolyte membrane and the catalyst electrode layer can be improved, but also stress generated by heat cycle can be dispersed when using it to constitute a fuel cell, so that it is possible to greatly improve the durability of the fuel cell.

Also, the OH-type anion-exchange hydrocarbon-based elastomer is needed to be poorly-soluble in water. When using it to constitute a fuel cell, the elastomer is eluted from the catalyst electrode layer, resulting in reduction in battery performance if it is easily dissolved. Note that "poorly-soluble in water" here means that the elastomer has solubility to water at 20° C. (a concentration of the above polymeric elastomer in a saturated aqueous solution) of less than 1 wt %, preferably 0.8 wt % or less.

The OH-type anion-exchange hydrocarbon-based elastomer of the present invention is not particularly limited in its structure as far as it satisfies the above features, and it may be derived from various polymeric compounds. A hydrocarbon-based elastomer here means a polymeric compound in which most part except for an ion exchange group (including an OH-type anion-exchange group having OH⁻ as a counterion) in its molecule is constituted by a hydrocarbon skeleton. However, within the range not inhibiting the effects of the present invention, atoms other than carbon atoms and hydrogen atoms may be included in a part other than the anion-exchange group in its molecule. For example, ether bond, ester bond, amide bond, siloxane bond, etc. may be introduced as a bond constituting main chain and side chain of the molecule in addition to carbon-carbon bond and carbon=carbon bond (double bond). Hetero atoms such as oxygen, nitrogen, silicon, sulfur, boron and phosphorus introduced by the above bonds may be included in a total amount of 40% or less, preferably 10% or less, in the total number of atoms constituting the part of the molecule other than the ion exchange group. Further, chlorine, bromine, fluorine, iodine and other atoms may also be bonded to the main chain and side chain directly or as a substituent in an amount of 40% or less, preferably 10% or less, of the number of hydrogen atoms present in the molecule.

As the OH-type anion-exchange group having OH⁻ as a counterion in the above OH-type anion-exchange hydrocarbon-based elastomer, any anion-exchange substituent having OH⁻ as a counterion can be used without particular limitation, and there may be mentioned quaternary ammonium base, pyridinium base, imidazolium base, phosphonium base, etc. having OH⁻ as a counterion. Particularly, it is preferable to use quaternary ammonium base or pyridinium base having OH⁻ as a counterion because of the strong basicity. The content of the ion exchange group is not particularly limited, and for providing good ion conductivity to the catalyst electrode layer, anion-exchange capacity is preferably 0.1 to 5.0 mmol/g, more preferably 0.5 to 3.0 mmol/g. However, when the hydrocarbon-based elastomer is non-crosslinkable, the elastomer having high ion exchange capacity is water-soluble, so that 0.5 to 2.5 mmol/g is preferable.

Note that all of the above anion-exchange groups are not necessarily a hydroxide ion (OH-type), and there may be included anion-exchange groups having chloride ion, bromide ion, iodide ion, sulfuric acid ion, sulfite ion, carbonate ion, hydrogen carbonate ion, nitrate ion, nitrite ion, etc. as a counter anion. These other anion-exchange groups may be included in a rate of 10 mol or less per 100 mol of entire ion exchange groups.

Also, when the counterion species of the anion-exchange hydrocarbon-based elastomer is OH⁻, i.e. in case of an OH-type anion-exchange hydrocarbon-based elastomer, carbon dioxide in air is absorbed, and the counterion OH⁻ is rapidly reacted with carbon dioxide and substituted with $CO_3^{2-}$, followed by $HCO_3^-$. However, the $CO_3^{2-}$ and/or $HCO_3^-$ is substituted (ion-exchanged) with OH⁻ generated by catalyst reaction in power generation of a fuel cell while operating the fuel cell, and the $CO_3^{2-}$ and/or $HCO_3^-$ is released out of the system as carbon dioxide. Therefore, even when a part or whole of the counterion species (OH⁻) of the anion-exchange hydrocarbon-based elastomer is substituted with $CO_3^{2-}$ and/or $HCO_3^-$, operation of a fuel cell may have no problem. Consequently, the anion-exchange hydrocarbon-based elastomer according to the present invention may include an anion-exchange hydrocarbon-based elastomer having OH⁻, $CO_3^{2-}$ and/or $HCO_3^-$ as counterion species, wherein a part of the counterion species (OH⁻) thereof is substituted with $CO_3^{2-}$ and/or $HCO_3^-$, as well as a carbonic acid-type anion-exchange hydrocarbon-based elastomer wherein the whole of the counterion species (OH⁻) of the OH-type anion-exchange hydrocarbon-based elastomer is substituted with $CO_3^{2-}$ and/or $HCO_3^-$. A variety of properties such as the degree of elasticity and solubility to water of these anion-exchange hydrocarbon-based elastomers are same as those of said OH-type anion-exchange hydrocarbon-based elastomer. Note that there is a big difference in pKa between OH⁻ ion and $HCO_3^-$ ion in these carbonic acid-type anion-exchange hydrocarbon-based elastomer, so that either ion becomes trace amount, which is substantially vanishingly small, when these ions coexist.

Since the solubility to water or organic solvent and the degree of elasticity of the OH-type and carbonic acid-type anion-exchange hydrocarbon-based elastomer is controlled by amount of anion-exchange groups in the elastomer, molecule amount, amount of double bonds and degree of crosslinking, it is preferable to design with consideration for these points at molecular design.

The OH-type anion-exchange hydrocarbon-based elastomer can be manufactured in the following production method, for instance.

Namely, a block copolymer obtained by block polymerizing a polymerizable monomer, having a functional group capable of introducing an anion-exchange group, and a conjugated diene compound is hydrogenated so as to have hydrogenation rate of 80 to 97%, more preferably 90 to 95%, to form a hydrogenated polymer; an anion-exchange group with halogen ion as a counterion is introduced into the hydrogenated polymer; and the obtained halogen ion type anion-exchange group-containing hydrogenated polymer is ion exchanged to obtain an OH-type anion-exchange group-containing hydrogenated polymer, followed by drying at 40° C. or lower under reduced pressure, so that an OH-type anion-exchange hydrocarbon-based elastomer of the present invention can be obtained.

As the monomer having a functional group capable of introducing an anion-exchange group used in the above method, there may be mentioned an aromatic vinyl compound such as styrene, α-methylstyrene, chloromethylstyrene, vinylpyridine, vinylimidazole and vinylnaphthalene. Among these, styrene and α-methylstyrene are preferably used since they are easier to introduce an anion-exchange group. As the conjugated diene compound used in the above method, there may be mentioned butadiene, isoprene, chloroprene, 1,3-pentadiene, 2,3-dimethyl-1,3-butadiene, etc. The content is not particularly limited, and in general, a content rate of the conjugated diene compound unit in the block copolymer is 5 to 90 wt %, particularly 20 to 80 wt %.

Also, in addition to the above monomer having a functional group capable of introducing an anion-exchange group, conjugated diene compound and crosslinkable monomer, if necessary, other monomers copolymerizable with these monomers may be added. As the other monomers, for example, a vinyl compound such as ethylene, propylene, butylene, acrylonitrile, vinyl chloride and an ester of acrylic acid may be used. The amount used is preferably 0 to 100 parts by weight per 100 parts by weight of the monomer having a functional group capable of introducing an anion-exchange group.

As a polymerization procedure in the above method, a publicly-known polymerization method such as solution polymerization, suspension polymerization and emulsion polymerization can be employed. The manufacturing conditions are influenced by the constitution of monomer composition, etc., not particularly limited and may properly be selected. In the case of polymerization to obtain the hydrocarbon-based polymer having the above properties, for example, it is preferable to polymerize the above-mentioned monomer such as styrene under the polymerization conditions so as to have weight average molecular weight of 10,000 to 1,000,000, preferably 50,000 to 200,000. A desired anion-exchange group can be introduced into the obtained block copolymer by publicly-known method such as amination and alkylation.

Note that the following method is particularly preferable among the above-illustrated methods since the above highly effective hydrocarbon-based elastomer can be easily obtained: the method wherein several kinds of monomers constituting hard segment and soft segment (normally a polymerization block of an aromatic vinyl compound constitutes hard segment, and a polymerization block of the conjugated diene compound constitutes soft segment) are used as the monomer having a functional group capable of introducing an anion-exchange group and conjugated diene compound for block copolymerization to obtain a so-called thermoplastic elastomer, followed by hydrogenation, and then, the anion-exchange group is introduced.

In this case, a combination of monomers for copolymerization may be determined according to the common method for synthesis of a thermoplastic elastomer, followed by polymerization according to a routine method. Specific examples of a thermoplastic elastomer capable of introducing an anion-exchange group may include polystyrene-polybutadiene copolymer (SB), polystyrene-polyisoprene polymer (SI), polystyrene-polybutadiene-polystyrene triblock copolymer (SBS), polystyrene-polyisoprene-polystyrene triblock copolymer (SIS) and polystyrene-poly(1,3-pentadiene)-polystyrene triblock copolymer (SPS). These thermoplastic elastomers such as SBS and SIS can give, as a result of the after-mentioned hydrogenation, polystyrene-poly(ethylene-butylene) copolymer (SEB), polystyrene-poly(ethylene-propylene) copolymer (SEP), polystyrene-poly(ethylene-butylene)-polystyrene triblock copolymer (SEBS), polystyrene-poly(ethylene-propylene)-polystyrene triblock (SEPS) copolymer and polystyrene-poly(ethylene-propylene-pentene)-polystyrene triblock copolymer. Therefore, the elastomer may be produced by combining monomers to give the above copolymer. Among the above monomers, polystyrene-poly(ethylene-butylene)-polystyrene triblock copolymer (SEBS) and polystyrene-poly(ethylene-propylene)-polystyrene triblock copolymer (SEPS) are preferable since they show stability in the step of introducing the ion exchange group, and allow inhibiting the obtained ion-conductivity imparting agent from having high viscosity.

Also, the monomer composition for polymerization is not particularly limited. In view of electric and mechanical properties, a content rate of an aromatic vinyl compound unit to be hard segment of the thermoplastic elastomer in the block copolymer is preferably 10 to 95 wt %, particularly preferably 20 to 80 wt %, so that the composition so as to have such a content rate is preferable.

The copolymerization procedure of the aromatic vinyl compound and conjugated diene compound is not particularly limited, and a publicly-known method such as anionic polymerization, cationic polymerization, coordination polymerization and radical polymerization can be used. Living anionic polymerization is particularly preferably used since it can easily control block structure. Note that the block copolymerization can be any of diblock copolymerization, triblock copolymerization, radial block copolymerization and multiblock copolymerization, and triblock copolymerization is preferable since adhesion between the solid polymer electrolyte membrane and catalyst electrode layer is improved by agglutinating end blocks to form a domain in the obtained catalyst electrode layer, and an effect to disperse stress due to heat cycle generated when using it to constitute a fuel cell is high. Further, because of its ease of molding process as in the thermoplastic resin, it is preferable to polymerize under the polymerization conditions so as to have weight average molecular weight of each block copolymer of 10,000 to 300,000, particularly 20,000 to 150,000.

In the present invention, the above-mentioned thermoplastic elastomer (block copolymer) is hydrogenated, followed by introduction of an ion exchange group. The hydrogenation of the elastomer can be done by, for example, the method disclosed in reference example 1 of Japanese Unexamined Patent Publication 2005-272528 and the method disclosed in Example of Japanese Unexamined Patent Publication 2006-213853. There may be mentioned a method wherein an inhomogeneous catalyst such as palladium carbon and Raney nickel, or homogeneous catalyst such as Wilkinson catalyst is used in the presence of hydrogen as a contact catalyst for hydrogenation, etc. It is preferable not to completely hydrogenate all unsaturated double bonds in the thermoplastic elastomer, so as to control the iodine value of the finally obtained OH-type anion-exchange hydrocarbon-based elastomer in the range of 3 to 25 as mentioned above. For obtaining the thermoplastic elastomer with thus-controlled iodine value of 3 to 25, hydrogenation is done in a rate of normally 80 to 97%, further preferably 90 to 95%. Note that hydrogenation rate is a rate of hydrogenated bonds to all unsaturated double bonds in the above-mentioned thermoplastic elastomer (before hydrogenation), obtained by nuclear magnetic resonator (NMR).

Then, an anion-exchange group having a halogen ion as a counterion is introduced into the obtained hydrogenated polymer. A method for introduction of the anion-exchange group having a halogen ion as a counterion is not particularly limited, but it is particularly preferable to perform halogeno-alkylation such as chloromethylation of the hydrogenated polymer prior to the introduction. When the halogeno-alkylation of the hydrogenated polymer is, for example, chloromethylation, the hydrogenated polymer is dissolved in chloroform, and chloromethyl methyl ether and zinc chloride are then added into the obtained solution.

Then, an anion-exchange group having a halogen ion as a counterion is introduced to the halogeno-alkylated hydrogenated polymer. The anion-exchange group is not particularly limited as far as it is a substituent having anion-exchange capacity and a halogen ion as a counterion, and any publicly-known anion-exchange group such as quaternary ammonium base, pyridinium base, imidazolium base and phosphonium base can be used. Particularly, it is preferable to use quaternary ammonium base or pyridinium base because of the strong basicity. The quaternary ammonium base is, for example, introduced by treating the chloromethylated hydrogenated polymer by a tertiary amine such as trimethylamine. The content of the anion-exchange group is not particularly limited, and is preferably 0.1 to 5.0 mmol/g, more preferably 0.5 to 3.0 mmol/g.

Then, the obtained anion-exchange group-containing hydrogenated polymer having a halogen ion as a counterion is ion-exchanged to obtain an OH-type anion-exchange group-containing hydrogenated polymer having $OH^-$ as a counterion. The conversion to the OH-type is done by dipping the above anion-exchange group-containing hydrogenated polymer into an alkali hydroxide aqueous solution such as sodium hydroxide aqueous solution and potassium hydroxide aqueous solution. The concentration of the alkali hydroxide aqueous solution is not particularly limited, and is approximately 0.1 to 2 mol/L. The dipping temperature is 5 to 60° C., and the dipping time is approximately 0.5 to 24 hours.

The anion-exchange hydrocarbon-based elastomer having $OH^-$ as a counterion species obtained by the above-mentioned ion exchange method, i.e. the OH-type anion-exchange hydrocarbon-based elastomer, absorbs carbon dioxide in air, to rapidly substitute the counterion, $OH^-$, with $CO_3^{2-}$, then $HCO_3^-$, by reacting with carbon dioxide. Therefore, the anion-exchange hydrocarbon-based elastomer having $OH^-$, $CO_3^{2-}$ and/or $HCO_3^-$ as a counterion species and the carbonic acid-type anion-exchange hydrocarbon-based elastomer having $CO_3^{2-}$ and/or $HCO_3^-$ as a counterion species according to the present invention can be obtained by leaving the OH-type anion-exchange hydrocarbon-based elastomer in air.

Further, the carbonic acid-type anion-exchange hydrocarbon-based elastomer can be directly produced without going through the OH-type. Namely, it is possible that an anion-exchange group-containing hydrogenated polymer having a halogen ion as a counterion is ion-exchanged to directly obtain a carbonic acid-type anion-exchange group-containing hydrogenated polymer having $CO_3^{2-}$ and/or $HCO_3^-$ as a counterion. The conversion to the carbonic acid-type is done by dipping the above anion-exchange group-containing hydrogenated polymer having a halogen ion as a counterion into an alkaline carbonate aqueous solution or alkaline bicarbonate aqueous solution such as sodium carbonate aqueous solution, sodium bicarbonate aqueous solution, potassium carbonate aqueous solution and potassium bicarbonate aqueous solution. The concentration of the alkaline carbonate aqueous solution or alkaline bicarbonate aqueous solution is not particularly limited, and is approximately 0.1 to 2 mol/L. Also, the dipping temperature is 5 to 60° C., and the dipping time is approximately 0.5 to 24 hours.

After that, the obtained anion-exchange group-containing hydrogenated polymer having $OH^-$, $CO_3^{2-}$ and/or $HCO_3^-$ as a counterion is dried to obtain the anion-exchange hydrocarbon-based elastomer according to the present invention. Note that the anion-exchange hydrocarbon-based elastomer in the present invention includes, as mentioned earlier, an OH-type anion-exchange hydrocarbon-based elastomer, a carbonic acid anion-exchange hydrocarbon-based elastomer and an anion-exchange hydrocarbon-based elastomers having $OH^-$, $CO_3^{2-}$ and/or $HCO_3^-$ as a counterion species. The drying temperature in the case of the anion-exchange hydrocarbon-based elastomer is 40° C. or lower, preferably 5 to 37° C., further preferably 15 to 37° C. The drying step is done under a reduced pressure, preferably 200 Pa or less, further preferably 50 to 150 Pa. When the drying temperature exceeds 40° C., a polymerizable double bond in the anion-exchange hydrocarbon-based elastomer may react, causing to form a cross-link structure and to gelate. When gelation occurs, it becomes difficult to dissolve the elastomer in the after-mentioned organic solvent, so that homogeneous ion-conductivity imparting agent cannot be obtained. Also, when ambient pressure at drying is too high, drying may take time.

The anion-exchange hydrocarbon-based elastomer of the present invention can be preferably used as a base compound of the ion-conductivity imparting agent. Namely, the ion-conductivity imparting agent of the present invention is obtained by dissolving or dispersing the above anion-exchange hydrocarbon-based elastomer in an organic solvent.

The ion-conductivity imparting agent here indicates an agent used by adding into the composition for forming a catalyst electrode layer, or by applying to the electrode forming face of the solid polymer electrolyte membrane when forming the catalyst electrode layer of a solid polymer type fuel cell described in the Description of the Related Art, in order to increase the conductivity of ion (specifically ion such as proton and hydroxide ion generated on the catalyst included in the catalyst electrode layer) inside or near the surface of the catalyst electrode layer. Also, the ion-conductivity imparting agent can be used by applying on a side of the separately-prepared catalyst electrode layer. Note that the ion-conductivity imparting agent of the present invention is usable for any of catalyst electrode layers of a solid polymer type fuel cell, and that it is most effective and therefore preferable to use for forming a catalyst electrode layer of a solid polymer type fuel cell in which a hydrocarbon-based anion-exchange membrane is used as a solid polymer electrolyte membrane.

An organic solvent used for the ion-conductivity imparting agent is not particularly limited as far as said anion-exchange hydrocarbon-based elastomer can uniformly be dissolved or dispersed therein, and it is particularly preferable to use 2 or more solvents or dispersion media having different permittivity (hereinafter may be referred to as a mixed solvent) in view of improvement in homogeneous property of the solution or dispersion liquid.

A preferable mixed solvent comprises a hydrophobic solvent and a hydrophilic solvent.

The hydrophobic solvent has relative permittivity at 20° C. of 2 to 12, preferably 2 to 10. Such a hydrophobic solvent includes a nonpolar solvent such as hexane (relative permittivity: 2.0), toluene (2.2), benzene (2.3), diethyl ether (4.3), chloroform (4.9), 1,2-dimethoxyethane (5.5), acetic ether (6.0), tetrahydrofuran (7.6) and dichloromethane (9.1). These can be used alone or in combination of 2 or more.

The hydrophilic solvent has relative permittivity at 20° C. of 13 to 50, preferably 15 to 45. Such a hydrophilic solvent includes a polar non-protogenic solvent such as acetone (21), acetonitrile (37), N,N-dimethylformamide (38) and dimethylsulfoxide (42.5), and a polar protogenic solvent such as cyclohexanol (15.0), 1-butanol (18), 2-propanol (18), 1-propanol (22.2), ethanol (24), 2-ethoxyethanol (29.6) and methanol (33). These can be used alone or in combination of 2 or more.

A weight ratio of the hydrophobic solvent and the hydrophilic solvent (hydrophobic solvent/hydrophilic solvent) is 98/2 to 90/10, preferably 98/2 to 92/8. Too large weight ratio of the hydrophobic solvent may cause high viscosity (gelation) by agglutinating anion-exchange groups (hydrophilic groups) in the skeleton of the anion-exchange hydrocarbon-based elastomer. On the other hand, when excessively using the hydrophilic solvent, the hydrocarbon skeleton of the anion-exchange hydrocarbon-based elastomer may agglutinate to become insoluble, so that a homogeneous solution cannot be obtained.

As described above, when using a mixed solvent including the hydrophobic solvent and hydrophilic solvent in a specific ratio, the anion-exchange hydrocarbon-based elastomer is uniformly dissolved or dispersed without agglutination. Solubility and dispersibility of the anion-exchange hydrocarbon-based elastomer to the mixed solvent can be checked by separation of insoluble component by centrifugation method and pressure filtration method, turbidity measurement of the obtained ion-conductivity imparting agent, etc.

The combination of the hydrophobic solvent and the hydrophilic solvent is not particularly limited, and by using at least one selected from tetrahydrofuran, toluene, dichloromethane and chloroform as the hydrophobic solvent, and using at least one selected from 1-propanol, 2-ethoxyethanol, cyclohexanol and dimethylsulfoxide as the hydrophilic solvent, it is possible to easily obtain an ion-conductivity imparting agent for forming a catalyst electrode layer in which the anion-exchange hydrocarbon-based elastomer is uniformly dissolved.

In the ion-conductivity imparting agent for forming a catalyst electrode layer obtained by using the above mixed solvent, the anion-exchange hydrocarbon-based elastomer is uniformly dissolved or dispersed in the mixed solvent without agglutination. Therefore, even when the anion-exchange hydrocarbon-based elastomer is high in concentration, it is possible to obtain an ion-conductivity imparting agent for forming a catalyst electrode layer having appropriate concentration and viscosity without thickening.

As the anion-exchange hydrocarbon-based elastomer used for making the ion-conductivity imparting agent for forming a catalyst electrode layer, it is particularly preferable to use the one having solubility (concentration at 20° C. of the above anion-exchange hydrocarbon-based elastomer in the saturated solution) to the used organic solvent of 1 wt % or more, particularly 3 wt % or more. The concentration of said anion-exchange hydrocarbon-based elastomer in the ion-conductivity imparting agent of the present invention is not particularly limited, and it is properly determined based on the combination of the solvents and anion-exchange hydrocarbon-based elastomer, used amount to the electrode catalyst, viscosity, permeability when operated, etc.

Particularly in view of ease of handling, the obtained electrode layer properties, etc., in the ion-conductivity imparting agent for forming a catalyst electrode layer of the present invention, the anion-exchange hydrocarbon-based elastomer is preferably included in a weight of preferably 3 to 20 parts by weight, further preferably 4 to 12 parts by weight, to a total of 100 parts by weight of the organic solvent. Particularly, in the ion-conductivity imparting agent for forming a catalyst electrode layer of the present invention, it is possible to make the anion-exchange hydrocarbon-based elastomer high in concentration without thickening. The present invention provides an ion-conductivity imparting agent for forming a catalyst electrode layer, in which the anion-exchange hydrocarbon-based elastomer is uniformly dispersed without agglutination, even in a high concentration region where the anion-exchange hydrocarbon-based elastomer is 5 to 20 parts by weight to 100 parts by weight of the organic solvent. Also, the viscosity can be controlled by properly selecting the used amount of the solvent depending on a mode of using at the time of operation.

Also, the ion-conductivity imparting agent for forming a catalyst electrode layer of the present invention may include, in addition to the above anion-exchange hydrocarbon-based elastomer and organic solvent, other additives such as a binding agent, a viscosity modifier, an antioxidizing agent and a thermostabilizing agent in a range of not undermining an effect of the present invention. When using these additives, a total amount of the additives is desirably 5 parts by weight, preferably 1 parts by weight, per 100 parts by weight of the organic solvent.

The ion-conductivity imparting agent for forming a catalyst electrode layer of the present invention can be obtained by mixing the above anion-exchange hydrocarbon-based elastomer and organic solvent as well as other additives added if desired by a routine method, and dissolving or dispersing the elastomer in the organic solvent.

The composition for forming a catalyst electrode layer of the present invention comprises the above ion-conductivity imparting agent and electrode catalyst. The composition for forming a catalyst electrode layer here indicates a composition (embrocation) for producing a catalyst electrode layer of a solid polymer type fuel cell.

As the electrode catalyst, metallic particle such as platinum, gold, silver, palladium, iridium, rhodium, ruthenium, tin, iron, cobalt, nickel, molybdenum, tungsten, vanadium or their alloys, accelerating oxidation of hydrogen and reduction of oxygen, can be used without any limitation, and it is preferable to use a platinum-group catalyst because of its excellent catalyst activity. Note that the particle size of the metallic particle as a catalyst is normally 0.1 to 100 nm, more preferably 0.5 to 10 nm. The smaller the particle size is, the higher the catalyst performance is, but it is hard to produce particle with the size of less than 0.5 nm while it is hard to obtain sufficient catalyst performance in particle with the size of more than 100 nm. Note that the catalyst may be preliminarily supported by a conductive agent before the use. As the conductive agent, any electron conducting substance can be used without particular limitation, and for example, carbon black such as furnace black and acetylene black, activated carbon, black lead, etc. is normally used alone or mixed to use.

The catalyst amount included in the composition for forming a catalyst electrode layer is not particularly limited, and it is preferable that the electrode catalyst is included in metal weight of 10 to 700 parts by weight, more preferably 15 to 500 parts by weight and particularly preferably 20 to 400 parts by weight, per 100 parts by weight of the anion-exchange hydrocarbon-based elastomer in the ion-conductivity imparting agent. Also, the amount of the electrode catalyst is preferably 0.01 to 10 mg/cm$^2$, more preferably 0.1 to 5.0 mg/cm$^2$, in metal weight per unit area when the composition is sheeted.

The composition for forming a catalyst electrode layer may include a binding agent if needed. As the binding agent, a variety of thermoplastic resin can normally be used, and preferable examples of the thermoplastic resin include, polytetrafluoroethylene, polyvinylidene fluoride, tetrafluoroethylene-perfluoroalkyl vinyl ether copolymer, polyether ether ketone, polyethersulfone, styrene-butadiene copolymer and acrylonitrile-butadiene copolymer. When adding the binding agent, the amount is preferably 25 wt % or less per total amount of the composition for forming a catalyst electrode layer. Also, the binding agent may be used alone or in mixture of 2 or more.

Next, examples of use for the ion-conductivity imparting agent and composition for forming a catalyst electrode layer of the present invention will be described.

The ion-conductivity imparting agent of the present invention is applied to a catalyst electrode layer of a solid polymer type fuel cell, preferably in which a hydrocarbon-based anion-exchange membrane is used as a solid polymer electrolyte membrane. Application technique is not particularly limited, as far as it is a method wherein an electrode catalyst at least located near a surface of the catalyst electrode layer bonding to the solid polymer electrolyte membrane contacts with the ion-conductivity imparting agent of the present invention.

For example, preferable application techniques include (1) a method comprising the steps of adding the binding agent and dispersion medium to the electrode catalyst if needed to obtain composition paste, directly forming it into a roll or applying it on a support layer material such as carbon paper followed by heat treatment to obtain a layered substance, applying the ion-conductivity imparting agent of the present invention to a surface to become its bonding surface followed by drying if needed, and thermally compressing it to the solid polymer electrolyte membrane; or (2) a method comprising the steps of adding the ion-conductivity imparting agent of the present invention, and the binding agent and dispersion medium to the electrode catalyst if needed to obtain the composition for forming a catalyst electrode layer of the present invention, transferring it onto a solid polymer electrolyte membrane by applying it on a support layer material such as carbon paper or applying to a separating material, or otherwise directly applying it on the solid polymer electrolyte membrane, drying and then thermally compressing it to solid polymer electrolyte membrane.

In these methods, it is more preferable to include the ion-conductivity imparting agent of the present invention in the broader range of the electrode in view of making the reaction site in the catalyst electrode layer a three-dimensional structure. It is more preferable to select the method (2) in the above two methods since this method is easier to include the ion-conductivity imparting agent more uniformly in the entire electrode. Note that the ion-conductivity imparting agent of the present invention may be applied to the catalyst electrode layer bonding to at least one face of the solid polymer electrolyte membrane, and that it is preferable to apply to the oxidizing agent chamber side catalyst electrode layer when applying to only one of the catalyst electrode layers because of its high conductivity-imparting effects of an anion such as hydroxide ion. In such a case, it is preferable to apply other ion-conductivity imparting agent to the fuel chamber side catalyst electrode layer. As the other ion-conductivity imparting agent, any publicly-known agent can be used without limitation. Also, it is surly possible that the ion-conductivity imparting agent of the present invention is used concurrently with the other ion-conductivity imparting agent (for example used in a mixture).

A variety of materials used in the above application technique (1) and/or (2) are not particularly limited, and those used in the conventional polymeric-type fuel cell can be used without any limitation. For example, as the solid polymer electrolyte membrane, any publicly-known cation-exchange resin membrane or anion-exchange resin membrane, known to be used as a solid polymer electrolyte membrane for a polymeric-type fuel cell, can be used without limitation. However, as mentioned in the above Description of the Related Art, it is preferable to use the hydrocarbon-based anion-exchange membrane since the problems such as the above (i) to (iv) hardly occur. As the preferably used hydrocarbon-based anion-exchange membrane, there may be mentioned a membrane wherein the desired anion-exchange group is introduced by treatment such as amination or alkylation of a copolymer such as chloromethylstyrene-divinyl benzene copolymer and vinylpyridine-divinyl benzene. These anion-exchange resin membranes are usually supported by base material such as thermoplastic resin woven fabric, nonwoven fabric and porous membrane, and as the base material, it is preferable to use a base material comprising a thermoplastic resin porous membrane including polyolefin resin such as polyethylene, polypropylene and polymethylpentene, fluorine-based resin such as polytetrafluoroethylene, poly(tetrafluoroethylene-hexafluoropropylene) and polyvinylidene fluoride since it is low in gas permeability and can be a thin layer. Also, the preferable thickness of the hydrocarbon-based anion-exchange membrane is, in view of suppressing electric resistance at low level and giving mechanical strength necessary as a support membrane, normally 5 to 200 µm, and more preferably 20 to 150 µm.

Also, as an optionally used support layer material, normally, porous membrane such as carbon fiber woven fabric and carbon paper can be used. The thickness of the support layer material is preferably 50 to 300 µm, and the porosity is preferably 50 to 90%. Normally, a paste composition including said electrode catalyst is filled in the void and attached to the surface of the support layer material so as to have a thickness of 5 to 50 µm, so that the catalyst electrode layer is constituted.

Also, the amount of the ion-conductivity imparting agent of the present invention is not particularly limited in the above method (1), and in view of ion conductivity imparting effects, the amount of the ion-conductivity imparting agent of the present invention is preferably 5 to 60 wt %, particularly preferably 10 to 40 wt %, with regard to the electrode catalyst present in the range of 1 to 50% of the entire thickness of the electrode layer from the bonding surface.

Further, in the above methods (1) and (2), when bonding, the catalyst electrode layers are thermally compressed by a pressurizing and heating equipment, normally by a hot press, roll press, etc. The press temperature is normally 80° C. to 200° C. The applied pressure depends on the thickness and hardness of the used catalyst electrode layer, and is normally 0.5 to 20 MPa.

Thus-prepared solid polymer electrolyte membrane/catalyst electrode layer membrane assembly by applying the ion-conductivity imparting agent of the present invention is used by equipping into a fuel cell having a basic structure as shown in FIG. 1.

EXAMPLE

Next, the present invention will be described further in detail based on examples, but the present invention is not limited to these examples. Note that properties of the ion-conductivity imparting agent in Examples and Comparative Examples are shown in values measured by the following methods.

1) Measurement of Carbonate Ion and Bicarbonate Ion Concentrations in Anion-Exchange Hydrocarbon-Based Elastomer First, 1.0 g of the anion-exchange hydrocarbon-based elastomer was dipped in 100 ml of 1 mol/L-NaCl aqueous solution for 30 minutes, and the obtained immersion fluid was titrated with 0.1 mol/L-phenolphthalein/ethanol solution, wherein the titer at an end point to change the color from red to colorless was defined as "V1" ml. By the titration, neutralization of $OH^-$ ion and an amount of conversion from $CO_3^{2-}$ ion to $HCO_3^-$ ion were measured. Then, the immersion fluid was titrated with mixed ethanol solution of 0.1 mol/L-bromocresol green-methyl red, wherein the titer at an end point to change the color from green to orange was defined as "V2" ml. By the second titration, an amount of conversion from $HCO_3^-$ ion to $H_2CO_3$ was measured.

Note that either of $OH^-$ ion and $HCO_3^-$ ion was substantially vanishingly small amount when coexisting based on the relation of pKa, concentrations of $OH^-$ ion, $CO_3^{2-}$ ion and $HCO_3^-$ ion in the anion-exchange hydrocarbon-based elastomer were calculated as follows depending on the following respective relationships between titers "V1" and "V2".

When V1>V2: only $OH^-$ ion and $CO_3^{2-}$ ion existed as ion species.

$$0.1 \times V2 \text{ [ml]} \times 10^{-3}/\text{elastomer weight [g]} = CO_3^{2-} \text{ ion concentration [mmol/g]}$$

$$0.1 \times (V1-V2) \text{ [ml]} \times 10^{-3}/\text{elastomer weight [g]} = OH^- \text{ ion concentration [mmol/g]}$$

When V1<V2: only $CO_3^{2-}$ ion and $HCO_3^-$ ion existed as ion species.

$0.1 \times V1$ [ml]$\times 10^{-3}$/elastomer weight [g]=$CO_3^{2-}$ ion concentration [mmol/g]

$0.1 \times (V2-V1)$ [ml]$\times 10^{-3}$/elastomer weight [g]=$HCO_3^-$ ion concentration [mmol/g]

When V1=V2: only $CO_3^{2-}$ ion existed as ion species.

$0.1 \times V1$ [ml]$\times 10^{-3}$/elastomer weight [g]=$CO_3^{2-}$ ion concentration [mmol/g]

2) Viscosity of the Ion-Conductivity Imparting Agent By using a cone-plate viscometer (digital viscometer model DV-II+ made by Brookfield Engineering Laboratories), the viscosity was measured at a temperature of 25° C.

3) Solubility Evaluation of the Ion-Conductivity Imparting Agent (Actual Concentration/Loaded Concentration Ratio)

For solubility evaluation of the ion-conductivity imparting agent, the actual concentration in a supernatant solution by a centrifugation method was measured, and a ratio of the actual concentration to the loaded concentration was determined as an indicator of the solubility evaluation.

First, 10 ml of the ion-conductivity imparting agent was placed in a 15-ml centrifuge separation tube and set the tube in a centrifuge (H-3H of KOKUSAN Co. Ltd.). While the number of rotations of the centrifuge was increased in series at 2500 rpm, 3000 rpm and 5000 rpm, insoluble matters were centrifuged for 10 minutes respectively. The actual concentration of the anion-exchange type hydrocarbon-based elastomer in the centrifuged supernatant solution was measured to calculate a ratio of the obtained actual concentration to the loaded concentration.

4) Appearance of Catalyst Electrode Layer

An electrode catalyst comprising carbon black wherein platinum with an average particle size of 2 nm was supported in an amount of 50 wt % was mixed with an ion-conductivity imparting agent prepared in the after-mentioned manufacturing example so that a weight ratio of the anion-exchange type hydrocarbon-based elastomer:catalyst electrode is 1:4, and a composition for forming a catalyst electrode layer was obtained. The obtained composition for forming a catalyst electrode layer was applied on the carbon paper having a thickness of 200 nm and porosity of 80% so as to have the amount of platinum of 0.5 mg/cm². Next, this was dried under atmospheric pressure at 25° C. for 15 hours, then further dried at 80° C. for 4 hours under reduced pressure, so that the catalyst electrode layer supported on carbon paper was produced. The content of the anion-exchange type hydrocarbon-based elastomer was 20 wt % in the catalyst electrode layer.

The appearance of the produced catalyst electrode layer was visually evaluated in the following criteria: those with no crack generated (AA), those with a few cracks generated (BB), and those with cracks generated in whole (CC).

5) BET Specific Surface Area of Catalyst Electrode Layer

The catalyst electrode layer supported on carbon paper produced according to the above 4) was cut into strip specimen, and placed into a measuring cell so as to have the amount of the catalyst electrode layer excluding the carbon paper of about 5 mg, for measuring sorption area of nitrogen gas by using a gas sorption analyzer (Chembet-3000 made by Quantachrome Instruments). The sorption area of nitrogen gas of the catalyst electrode layer was obtained by subtracting the gas sorption area obtained by only using carbon paper (i.e. the support) from the above obtained sorption area of nitrogen gas. Separately, the weight of the catalyst electrode layer on the carbon paper was measured, and the above sorption area of nitrogen gas of the catalyst electrode layer was converted into an area per unit weight of the catalyst electrode layer to obtain the BET specific surface area of the catalyst electrode layer, which is an index of the amount of air pores.

6) Area of Exposed Catalyst of Catalyst Electrode Layer

The catalyst electrode layer supported on carbon paper produced according to the above 4) was cut into strip specimen, and placed into a measuring cell so as to have the amount of the catalyst electrode layer excluding the carbon paper of about 5 mg, for measuring sorption area of hydrogen gas by using a gas sorption analyzer (Chembet-3000 made by Quantachrome Instruments) in pulse sorption method. The sorption area of hydrogen gas of the catalyst electrode layer was obtained by subtracting the gas sorption area obtained by only using carbon paper as the support from the above obtained sorption area of hydrogen gas. Separately, the weight of the catalyst electrode layer on the carbon paper was measured, and the above sorption area of hydrogen gas of the catalyst electrode layer was converted into an area per unit weight of the catalyst electrode layer to obtain the area of the exposed catalyst of the catalyst electrode layer.

7) Output Voltage of Fuel Cell

First, an anion-exchange membrane, having a porous polyethylene membrane as base material, including a chloromethyl styrene-divinyl benzene copolymer quaternarized with a trimethylamine to introduce a quaternary ammonium base group, and having anion-exchange capacity of 2.0 mmol/g and a thickness of 30 μm, was impregnated in 0.5 mol/L of sodium hydroxide aqueous solution, and the counterion of the anion-exchange group was ion-exchanged to convert into hydroxide ion. Then, the catalyst electrode layer supported on the carbon paper produced in the above 4) was set on the both faces of the anion-exchange membrane, hot pressed at 100° C. under a pressure of 5 MPa for 100 seconds, and left at room temperature for 2 minutes. The obtained anion-exchange membrane/catalyst electrode layer membrane assembly was set in a fuel cell shown in FIG. 1, and power generation test was done by setting the fuel cell temperature at 50° C., and supplying 10 wt % of methanol aqueous solution to the fuel chamber side and oxygen at atmospheric pressure at 200 ml/min. to the oxidizing agent chamber, for measuring terminal voltage of the cell at current density of 0 A/cm² and 0.1 A/cm².

Manufacturing Example 1

Raw Materials

A polystyrene-polyisoprene-polystyrene triblock copolymer (SIS) (weight average molecular weight of 30,000 and styrene content of 60 wt %) was used as a styrene-based elastomer. The iodine value of the styrene-based elastomer was 130.

(Hydrogenation)

By using a hydrogenation catalyst prepared by nickel octylate and triisopropyl aluminum, hydrogenation reaction was performed in a solution in which the above styrene-based elastomer was dissolved in cyclohexane, so that a hydrogenated styrene-based elastomer, polystyrene-poly(ethylene-propylene)-polystyrene triblock copolymer (SEPS) (weight average molecular weight of 30,000 and styrene content of 60 wt %), was obtained. The hydrogenation rate was 95%, and the iodine value of the hydrogenated styrene-based elastomer was 7.

(Chloromethylation)

A reaction to introduce a chloromethyl group was done in a solution in which the hydrogenated styrene-based elastomer was dissolved in chloromethyl methyl ether, by using anhydrous zinc chloride as a catalyst. The reaction was terminated by putting this into a mixed solution of 1,4-dioxane and water (in a ratio of 1:1), and then, an elastomer was precipitated by putting this into 30% of methanol aqueous solution. By drying it, a chloromethyl group-containing elastomer was obtained.

(Anion-Exchange Group Introduction)

Next, the obtained chloromethyl group-containing elastomer was suspended in an excess amount of 25 wt % of acetone aqueous solution including 3 wt % of trimethylamine, and agitated at room temperature for 4 days to convert the chloromethyl group into a quaternary ammonium base group in the chloromethyl group-containing elastomer. This reaction solution was agitated in 0.5 mol/L-hydrochloric acid for 1 hour and filtered off to obtain a chlorine-type anion-exchange hydrocarbon-based elastomer.

(Conversion to Oh-Type)

The chlorine-type anion-exchange hydrocarbon-based elastomer was suspended in an excess amount of 0.5 mol/L-NaOH aqueous solution, and the counterion of the quaternary ammonium base group was ion exchanged from chloride ion to hydroxide ion, followed by washing with ion-exchange water and drying at 40° C. under a reduced pressure of 100 Pa for 8 hours, so that an OH-type anion-exchange hydrocarbon-based elastomer was obtained.

Table 1 shows the iodine value, anion-exchange capacity and water solubility at 20° C. of the obtained OH-type anion-exchange hydrocarbon-based elastomer, and Table 2 shows concentrations of the hydroxide ion, carbonate ion and bicarbonate ion in the elastomer immediately after the manufacture, after 30 minutes in air and after 10 hours in air.

Manufacturing Example 2

Except for drying at 30° C. after the ion exchange to the OH-type, an OH-type anion-exchange hydrocarbon-based elastomer was obtained as in the manufacturing example 1.

Table 1 shows the iodine value, anion-exchange capacity and water solubility at 20° C. of the OH-type anion-exchange hydrocarbon-based elastomer, and Table 2 shows concentrations of the hydroxide ion, carbonate ion and bicarbonate ion in the elastomer immediately after the manufacture, after 30 minutes in air and after 10 hours in air.

Manufacturing Example 3

Comparative

Except for drying at 50° C. after the ion exchange to the OH-type, an OH-type anion-exchange hydrocarbon-based elastomer was obtained as in the manufacturing example 1.

Table 1 shows the iodine value, anion-exchange capacity and water solubility at 20° C. of the OH-type anion-exchange hydrocarbon-based elastomer, and Table 2 shows concentrations of the hydroxide ion, carbonate ion and bicarbonate ion in the elastomer immediately after the manufacture, after 30 minutes in air and after 10 hours in air.

Manufacturing Example 4

Raw Materials

A polystyrene-polybutadiene-polystyrene triblock copolymer (SBS) (weight average molecular weight of 30,000 and styrene content of 30 wt %) was used as a styrene-based elastomer. The iodine value of the styrene-based elastomer was 253.

(Hydrogenation)

The above styrene-based elastomer was subject to hydrogenation as in the manufacturing example 1, and a hydrogenated styrene-based elastomer, i.e. a polystyrene-poly(ethylene-butylene)-polystyrene triblock copolymer (SEBS) (weight average molecular weight of 30,000 and styrene content of 30 wt %) was obtained. The hydrogenation rate was 92%, and the iodine value of the hydrogenated styrene-based elastomer was 18.

Then, the chloromethylation, the introduction of the anion-exchange group and the conversion to the OH-type were performed as in the manufacturing example 1, and an OH-type anion-exchange hydrocarbon-based elastomer was obtained by washing with ion-exchange water and drying at 30° C. under a reduced pressure of 100 Pa for 8 hours.

Table 1 shows the iodine value, anion-exchange capacity and water solubility at 20° C. of the obtained OH-type anion-exchange hydrocarbon-based elastomer, and Table 2 shows concentrations of the hydroxide ion, carbonate ion and bicarbonate ion in the elastomer immediately after the manufacture, after 30 minutes in air and after 10 hours in air.

Manufacturing Example 5

Comparative

Except for drying at 50° C. after the ion exchange to the OH-type, an OH-type anion-exchange hydrocarbon-based elastomer was obtained as in the manufacturing example 4.

Table 1 shows the iodine value, anion-exchange capacity and water solubility at 20° C. of the OH-type anion-exchange hydrocarbon-based elastomer, and Table 2 shows concentrations of the hydroxide ion, carbonate ion and bicarbonate ion in the elastomer immediately after the manufacture, after 30 minutes in air and after 10 hours in air.

Manufacturing Example 6

Except for manufacturing so as to have the hydrogenation rate to the styrene-based elastomer of 82% and the iodine value of the hydrogenated styrene-based elastomer of 24, an OH-type anion-exchange hydrocarbon-based elastomer was obtained as in the manufacturing example 1.

Table 1 shows the iodine value, anion-exchange capacity and water solubility at 20° C. of the OH-type anion-exchange hydrocarbon-based elastomer, and Table 2 shows concentrations of the hydroxide ion, carbonate ion and bicarbonate ion in the elastomer immediately after the manufacture, after 30 minutes in air and after 10 hours in air.

Manufacturing Example 7

Comparative

Except for manufacturing so as to have the hydrogenation rate to the styrene-based elastomer of 100% and the iodine value of the hydrogenated styrene-based elastomer of 0, an OH-type anion-exchange hydrocarbon-based elastomer was obtained as in the manufacturing example 1.

Table 1 shows the iodine value, anion-exchange capacity and water solubility at 20° C. of the OH-type anion-exchange hydrocarbon-based elastomer, and Table 2 shows concentrations of the hydroxide ion, carbonate ion and bicarbonate ion in the elastomer immediately after the manufacture, after 30 minutes in air and after 10 hours in air.

Manufacturing Example 8

Comparative

Except for manufacturing so as to have the hydrogenation rate to the styrene-based elastomer of 75% and the iodine value of the hydrogenated styrene-based elastomer of 30, an OH-type anion-exchange hydrocarbon-based elastomer was obtained as in the manufacturing example 1.

Table 1 shows the iodine value, anion-exchange capacity and water solubility at 20° C. of the OH-type anion-exchange hydrocarbon-based elastomer, and Table 2 shows concentrations of the hydroxide ion, carbonate ion and bicarbonate ion in the elastomer immediately after the manufacture, after 30 minutes in air and after 10 hours in air.

Manufacturing Example 9

Comparative

Except for not converting to the OH-type after the introduction of an anion-exchange group, a chlorine-type anion-exchange hydrocarbon-based elastomer was obtained as in the manufacturing example 1.

Table 1 shows the iodine value, anion-exchange capacity and water solubility at 20° C. of the chlorine-type anion-exchange hydrocarbon-based elastomer, and Table 2 shows concentrations of the hydroxide ion, carbonate ion and bicarbonate ion in the elastomer immediately after the manufacture, after 30 minutes in air and after 10 hours in air.

Manufacturing Example 10

For a manufacturing example of a carbonic acid-type anion-exchange hydrocarbon-based elastomer, except for using 0.5 mol/L-$NaHCO_3$ aqueous solution, instead of 0.5 mol/L-NaOH aqueous solution used for conversion to the OH-type in the manufacturing example 1, and not converting to the OH-type after the introduction of an anion-exchange group, a carbonic acid-type anion-exchange hydrocarbon-based elastomer was obtained according to the manufacturing example 1.

Table 1 shows the iodine value, anion-exchange capacity and water solubility at 20° C. of the carbonic acid-type anion-exchange hydrocarbon-based elastomer, and Table 2 shows concentrations of the hydroxide ion, carbonate ion and bicarbonate ion in the elastomer immediately after the manufacture, after 30 minutes in air and after 10 hours in air.

TABLE 1

| | Raw Material | | Anion Exchange Hydrocarbon Elastomer | | | | |
|---|---|---|---|---|---|---|---|
| | Elastomer | | | | Anion- | | |
| Manufacturing Example | Resin | Hydrogenation Rate (%) | Dehydration Temperature (° C.) | Iodine Value | exchange capacity (mmol/g) | Water Solubility (wt %) | Ion exchange species |
| 1 | SEPS | 95 | 37° C. | 4 | 1.3 | 0.05 | $OH^-$ |
| 2 | SEPS | 95 | 30° C. | 4 | 1.3 | 0.05 | $OH^-$ |
| 3 (Comp.) | SEPS | 95 | 50° C. | 2 | 1.3 | 0.01 | $OH^-$ |
| 4 | SEBS | 91 | 30° C. | 12 | 1.5 | 0.03 | $OH^-$ |
| 5 (Comp.) | SEBS | 91 | 50° C. | 8 | 1.5 | 0.01 | $OH^-$ |
| 6 | SEPS | 82 | 37° C. | 24 | 1.3 | 0.04 | $OH^-$ |
| 7 (Comp.) | SEPS | 100 | 37° C. | 0 | 1.3 | 0.03 | $OH^-$ |
| 8 (Comp.) | SEPS | 75 | 37° C. | 30 | 1.3 | 0.02 | $OH^-$ |
| 9 (Comp.) | SEPS | 95 | 37° C. | 4 | 1.3 | 0.05 | $Cl^-$ |
| 10 | SEPS | 95 | 37° C. | 4 | 1.3 | 0.05 | $HCO^{3-}$ |

* SEPS: sulfonated-polystyrene-poly(ethylene-propylene)-polystyrene triblock copolymer (weight average molecular weight: Mw = 30,000, styrene content = 60 wt %)
* SEBS: sulfonated-polystyrene-poly(ethylene-butylene)-polystyrene triblock copolymer (weight average molecular weight: Mw = 30,000, styrene content = 30 wt %)

TABLE 2

| | Ratio of Ion Species in Anion Exchange Hydrocarbon Elastomer (%) | | | | | | | | |
|---|---|---|---|---|---|---|---|---|---|
| | Immediately after Manufacture | | | 30-min after Manufacture | | | 10-hr after Manufacture | | |
| Manufacturing Example | $OH^-$ | $CO_3^{2-}$ | $HCO_3^-$ | $OH^-$ | $CO_3^{2-}$ | $HCO_3^-$ | $OH^-$ | $CO_3^{2-}$ | $HCO_3^-$ |
| 1 | 98 | 2 | 0 | 0 | 64 | 36 | 0 | 36 | 64 |
| 2 | 98 | 2 | 0 | 0 | 63 | 37 | 0 | 31 | 69 |
| 3 (Comp.) | 97 | 3 | 0 | 0 | 61 | 39 | 0 | 33 | 67 |
| 4 | 99 | 1 | 0 | 0 | 67 | 33 | 0 | 38 | 62 |
| 5 (Comp.) | 98 | 2 | 0 | 0 | 65 | 35 | 0 | 33 | 67 |
| 6 | 96 | 4 | 0 | 0 | 64 | 36 | 0 | 36 | 64 |
| 7 (Comp.) | 94 | 6 | 0 | 0 | 64 | 36 | 0 | 35 | 65 |
| 8 (Comp.) | 96 | 4 | 0 | 0 | 61 | 39 | 0 | 33 | 37 |
| 9 (Comp.) | 0 | 0 | 0 | 0 | 0 | 0 | 0 | 0 | 0 |
| 10 | 0 | 0 | 100 | 0 | 0 | 100 | 0 | 0 | 100 |

Example 1

The anion-exchange type hydrocarbon-based elastomer in the manufacturing example 1 was dissolved in a mixed organic solvent shown in Table 3 in a predetermined concentration to obtain an ion-conductivity imparting agent of the present invention. The viscosity and evaluation result of solubility of the obtained ion-conductivity imparting agent (actual concentration/loaded concentration ratio) are shown in Table 3.

A composition for forming a catalyst electrode layer was prepared by using this ion-conductivity imparting agent to produce an anion-exchange membrane/catalyst electrode layer membrane assembly. The appearance of the catalyst electrode layer, BET specific surface area, area of exposed catalyst and fuel cell output voltage were evaluated. The results are shown in Table 4.

Examples 2 to 6

Except for changing the OH-type anion-exchange hydrocarbon-based elastomer and organic solvent for dissolving the same to those in Table 3, ion-conductivity imparting agents of the present invention were obtained as in Example 1. The viscosity and evaluation results of solubility (actual concentration/loaded concentration ratio) of the obtained ion-conductivity imparting agents are shown in Table 3.

A composition for forming a catalyst electrode layer was prepared by using each of these ion-conductivity imparting agents to produce an anion-exchange membrane/catalyst electrode layer membrane assembly. Table 4 shows the evaluation results of the appearance of the catalyst electrode layer, BET specific surface area, area of exposed catalyst and fuel cell output voltage.

Comparative Examples 1 to 4

In Comparative Examples 1 to 4, the OH-type anion-exchange hydrocarbon-based elastomers shown in Table 3 were respectively dissolved in the organic solvent shown in Table 3 to obtain an ion-conductivity imparting agent. The viscosity and evaluation results of solubility (actual concentration/loaded concentration ratio) of the obtained ion-conductivity imparting agents are shown in Table 3.

A composition for forming a catalyst electrode layer was prepared by each of these obtained ion-conductivity imparting agents to produce an anion-exchange membrane/catalyst electrode layer membrane assembly. Table 4 shows the evaluation results of the appearance of the catalyst electrode layer, BET specific surface area, area of exposed catalyst and fuel cell output voltage.

Comparative Example 5

In Comparative Example 5, the Cl-type anion-exchange hydrocarbon-based elastomer of the manufacturing example 9 was dissolved in organic solvent shown in Table 3 to obtain an ion-conductivity imparting agent. The viscosity and evaluation result of solubility (actual concentration/loaded concentration ratio) of the obtained ion-conductivity imparting agent are shown in Table 3.

A composition for forming a catalyst electrode layer was prepared by using the obtained ion-conductivity imparting agent to produce an anion-exchange membrane/catalyst electrode layer membrane assembly. Table 4 shows the evaluation results of the appearance of the catalyst electrode layer, BET specific surface area, area of exposed catalyst and fuel cell output voltage.

Example 7

Except for changing the OH-type anion-exchange hydrocarbon-based elastomer to the carbonic acid-type anion-exchange hydrocarbon-based elastomer manufactured by the manufacturing example 10, an ion-conductivity imparting agent of the present invention was obtained as in Example 1. The viscosity and evaluation result of solubility (actual concentration/loaded concentration ratio) of the obtained ion-conductivity imparting agent are shown in Table 3.

TABLE 3

| Example No. | Anion Exchange Hydrocarbon Elastomer | Concentration (wt %) | Hydrophobic Solvent | | Hydrophilic Solvent | | Viscosity (Pa · s) | Ratio of Loaded Concentration (wt %)/Actual Concentration (wt %) |
|---|---|---|---|---|---|---|---|---|
| | | | Solvent | Mixing Ratio (wt %) | Solvent | Mixing Ratio (wt %) | | |
| 1 | Manufacturing Example 1 | 5 | A | 98 | C | 2 | 1.0 | 5/5.0 |
| 2 | Manufacturing Example 2 | 5 | A | 98 | C | 2 | 1.0 | 5/5.0 |
| 3 | Manufacturing Example 2 | 5 | A | 95 | C | 5 | 0.8 | 5/4.9 |
| 4 | Manufacturing Example 4 | 5 | B | 98 | C | 2 | 1.2 | 5/5.0 |
| 5 | Manufacturing Example 4 | 5 | B | 90 | C | 10 | 3.2 | 5/5.0 |
| 6 | Manufacturing Example 6 | 5 | A | 98 | C | 2 | 5.1 | 5/4.1 |
| 7 | Manufacturing Example 10 | 5 | A | 98 | C | 2 | 1.0 | 5/5.0 |
| Comp. 1 | Manufacturing Example 3 | 5 | A | 98 | C | 2 | Slightly dissolved | 5/0.8 |
| Comp. 2 | Manufacturing Example 5 | 5 | B | 98 | C | 2 | Slightly dissolved | 5/0.3 |
| Comp. 3 | Manufacturing Example 7 | 5 | A | 98 | C | 2 | 1.4 | 5/5.0 |

TABLE 3-continued

| Example No. | Anion Exchange Hydrocarbon Elastomer | Concentration (wt %) | Hydrophobic Solvent | | Hydrophilic Solvent | | Viscosity (Pa·s) | Ratio of Loaded Concentration (wt %)/Actual Concentration (wt %) |
|---|---|---|---|---|---|---|---|---|
| | | | Solvent | Mixing Ratio (wt %) | Solvent | Mixing Ratio (wt %) | | |
| Comp. 4 | Manufacturing Example 8 | 5 | A | 98 | C | 2 | Slightly dissolved | 5/1.6 |
| Comp. 5 | Manufacturing Example 9 | 5 | A | 98 | C | 2 | 1.1 | 5/5.0 |

Hydrophobic Solvent
A; tetrahydrofuran (permittivity: 7.6)
B; chloroform (permittivity: 4.9)
Hydrophilic Solvent
C; 1-propanol (permittivity: 22.2)

A composition for forming a catalyst electrode layer was prepared by using the obtained ion-conductivity imparting agent to produce an anion-exchange membrane/catalyst electrode layer membrane assembly. Table 4 shows the evaluation results of the appearance of the catalyst electrode layer, BET specific surface area, area of exposed catalyst and fuel cell output voltage.

TABLE 4

| Example No. | Appearance of Gas Diffusion Electrode | BET Specific Surface Area ($m^2$/g-gas diffusion electrode) | Area of Exposed Catalyst ($m^2$/g-gas diffusion electrode) | Fuel Cell Output Voltage | |
|---|---|---|---|---|---|
| | | | | 0 A/$cm^2$ | 0.1 A/$cm^2$ |
| 1 | AA | 65 | 48 | 0.77 | 0.22 |
| 2 | AA | 66 | 46 | 0.76 | 0.21 |
| 3 | AA | 65 | 51 | 0.77 | 0.23 |
| 4 | AA | 61 | 50 | 0.76 | 0.22 |
| 5 | BB | 48 | 41 | 0.71 | 0.17 |
| 6 | BB | 39 | 38 | 0.72 | 0.18 |
| 7 | AA | 63 | 47 | 0.77 | 0.21 |
| Comp. 1 | CC | 21 | 15 | 0.31 | 0.04 |
| Comp. 2 | CC | 16 | 21 | 0.26 | 0.01 |
| Comp. 3 | CC | 36 | 18 | 0.61 | 0.17 |
| Comp. 4 | CC | 28 | 24 | 0.29 | 0.09 |
| Comp. 5 | AA | 62 | 47 | 0.12 | 0.02 |

Example 8

After evaluating the fuel cell output voltage (where time for evaluation was 10 hours), the fuel cells in Example 1 and Example 7 were taken apart, and concentrations of the counterion species of the anion-exchange hydrocarbon-based elastomer in the catalyst electrode layer were evaluated. As a result, the ratio of the counterion species in Example 1 was $OH^-$: 48% and $CO_3^{2-}$: 52%, and the ratio of the counterion species in Example 7 was $OH^-$: 46% and $CO_3^{2-}$: 54%.

The invention claimed is:

1. A hydrocarbon-based elastomer having an iodine value of 3 to 25, including an OH type anion-exchange group having $OH^-$ as a counterion in its molecule, and being poorly-soluble in water.

2. An ion-conductivity imparting agent for forming a catalyst electrode layer, comprising 3 to 20 parts by weight of the elastomer as set forth in claim 1 per 100 parts by weight of an organic solvent.

3. The ion-conductivity imparting agent as set forth in claim 2, wherein
said organic solvent comprises
a hydrophobic solvent having relative permittivity at 20° C. of 2 to 12 and
a hydrophilic solvent having relative permittivity at 20° C. of 13 to 50, and
mass ratio of the hydrophobic solvent and the hydrophilic solvent (hydrophobic solvent/hydrophilic solvent) is 98/2 to 90/10.

4. A composition for forming a catalyst electrode layer of a solid polymer type fuel cell, comprising the ion-conductivity imparting agent as set forth in claim 2 and an electrode catalyst.

5. A production method of the elastomer as set forth in claim 1, comprising the steps of
hydrogenating a block copolymer, obtained by block-polymerizing a polymerizable monomer having a functional group capable of introducing an anion-exchange group and a conjugated diene compound, to form a hydrogenated polymer so as to have a hydrogenation rate of 80 to 97%,
introducing an anion-exchange group having a halogen ion as a counterion into the hydrogenated polymer, ion-exchanging the obtained halogen ion type anion-exchange group-containing hydrogenated polymer to obtain an OH type anion-exchange group-containing hydrogenated
polymer having OH— as a counterion, and then drying the resulting polymer at 40° C. or lower under reduced pressure to form the elastomer.

6. A hydrocarbon-based elastomer having an iodine value of 3 to 25, including a carbonic acid-type anion-exchange group having $CO_3^{2-}$ and/or $HCO_3^-$ as a counterion in its molecule, and being poorly-soluble in water.

7. A hydrocarbon-based elastomer, including a carbonic acid-type anion-exchange group, in which a part or whole of OH⁻ of the hydrocarbon-based elastomer as set forth in claim 1 is converted into $CO_3^{2-}$ and/or $HCO_3^-$, in its molecule, and the elastomer being poorly-soluble in water.

8. An ion-conductivity imparting agent for forming a catalyst electrode layer, comprising 3 to 20 parts by weight of the elastomer as set forth in claim 6 per 100 parts by weight of an organic solvent.

9. The ion-conductivity imparting agent as set forth in claim 8, wherein
said organic solvent comprises
a hydrophobic solvent having relative permittivity at 20° C. of 2 to 12, and
a hydrophilic solvent having relative permittivity at 20° C. of 13 to 50, and
mass ratio of the hydrophobic solvent and the hydrophilic solvent (hydrophobic solvent/hydrophilic solvent) is 98/2 to 90/10.

10. A composition for forming a catalyst electrode layer of a solid polymer type fuel cell, comprising the ion-conductivity imparting agent as set forth in claim 8, and an electrode catalyst.

11. A production method of the elastomer as set forth in claim 6, comprising
steps of:
hydrogenating a block copolymer, obtained by block-polymerizing a polymerizable monomer having a functional group capable of introducing an anion-exchange group and a conjugated diene compound, to form a hydrogenated polymer so as to have a hydrogenation rate of 80 to 97%,
introducing an anion-exchange group having a halogen ion as a counterion into the hydrogenated polymer,
ion-exchanging the obtained halogen ion type anion-exchange group-containing hydrogenated polymer to obtain a carbonic acid-type anion-exchange group-containing hydrogenated polymer having $CO_3^{2-}$ and/or $HCO_3^-$ as a counterion, and then drying the resulting polymer at 40° C. or less under a reduced pressure to form the elastomer.

12. A hydrocarbon-based elastomer having an iodine value of 3 to 25, including an anion-exchange group having OH⁻, $CO_3^{2-}$ and/or $HCO_3^-$ as a counterion in its molecule, and being poorly-soluble in water.

13. A composition for forming a catalyst electrode layer of a solid polymer type fuel cell, comprising the ion-conductivity imparting agent as set forth in claim 3 and an electrode catalyst.

14. An ion-conductivity imparting agent for forming a catalyst electrode layer, comprising 3 to 20 parts by weight of the elastomer as set forth in claim 7 per 100 parts by weight of an organic solvent.

15. The ion-conductivity imparting agent as set forth in claim 8, wherein
said organic solvent comprises
a hydrophobic solvent having relative permittivity at 20° C. of 2 to 12, and
a hydrophilic solvent having relative permittivity at 20° C. of 13 to 50, and
mass ratio of the hydrophobic solvent and the hydrophilic solvent (hydrophobic solvent/hydrophilic solvent) is 98/2 to 90/10.

16. The ion-conductivity imparting agent as set forth in claim 15, wherein
said organic solvent comprises
a hydrophobic solvent having relative permittivity at 20° C. of 2 to 12, and
a hydrophilic solvent having relative permittivity at 20° C. of 13 to 50, and
mass ratio of the hydrophobic solvent and the hydrophilic solvent (hydrophobic solvent/hydrophilic solvent) is 98/2 to 90/10.

17. A composition for forming a catalyst electrode layer of a solid polymer type fuel cell, comprising the ion-conductivity imparting agent as set forth in claim 9, and an electrode catalyst.

18. A composition for forming a catalyst electrode layer of a solid polymer type fuel cell, comprising the ion-conductivity imparting agent as set forth in claim 15, and an electrode catalyst.

* * * * *